United States Patent
Oblizajek et al.

(10) Patent No.: US 6,305,755 B1
(45) Date of Patent: Oct. 23, 2001

(54) NOISE INHIBITING WHEEL COVER

(75) Inventors: Kenneth L. Oblizajek, Troy; Matthew E. Carroll, Grosse Pointe Woods; Mark S. Eshler, Northville; James P. McKeon, Franklin, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/551,165

(22) Filed: Apr. 17, 2000

(51) Int. Cl.[7] ..................................................... B60B 21/00
(52) U.S. Cl. ......................................... 301/37.1; 301/37.42
(58) Field of Search ........................... 301/37.1, 37.42, 301/37.31, 37.37, 37.38

(56) References Cited

U.S. PATENT DOCUMENTS

| | | | |
|---|---|---|---|
| 2,159,881 | * | 5/1939 | Booth ................................... 301/37.1 |
| 2,212,037 | * | 8/1940 | Lyon .................................... 301/37.1 |
| 2,736,610 | * | 2/1956 | Waite ................................... 301/37.1 |
| 3,092,420 | * | 6/1963 | Baldwin et al. ...................... 301/37.1 |
| 3,265,441 | * | 8/1966 | Baldwin ............................... 301/37.1 |
| 3,333,900 | * | 8/1967 | Aske, Jr. .............................. 301/37.1 |
| 3,397,918 | * | 8/1968 | Aske, Jr. et al. ..................... 301/37.1 |
| 3,397,921 | * | 8/1968 | Aske, Jr. .............................. 301/37.1 |
| 3,436,123 | * | 4/1969 | Aske, Jr. et al. ..................... 301/37.1 |
| 3,671,076 | * | 6/1972 | Aske, Jr. .............................. 301/37.1 |
| 5,346,288 | * | 9/1994 | Hodge et al. ....................... 301/37.37 |
| 5,393,128 | * | 2/1995 | Sarmast et al. ..................... 301/37.1 |

* cited by examiner

*Primary Examiner*—S. Joseph Morano
*Assistant Examiner*—Long Bao Nguyen
(74) *Attorney, Agent, or Firm*—Laura C. Hargitt

(57) ABSTRACT

A noise inhibiting wheel cover for a wheel assembly having a wheel includes a substrate adapted to engage the wheel of the wheel assembly. The noise inhibiting wheel cover also includes a layer of noise inhibiting material located at contact sites between the substrate and the wheel of the wheel assembly to reduce noise caused by mechanical actions therebetween.

2 Claims, 3 Drawing Sheets

NOISE INHIBITING WHEEL COVER

TECHNICAL FIELD

The present invention relates generally to wheels for vehicles and, more particularly, to a noise inhibiting wheel cover for a wheel of a vehicle.

BACKGROUND OF THE INVENTION

It is known to provide a wheel cover for a wheel of a vehicle. Typically, the wheel cover is generally circular in shape and made of a plastic or metal material. When the wheel cover is made of a plastic material, the plastic wheel covers have been observed to produce objectionable sound or noise such as "squeaks" under specific conditions of usage. These squeaks are usually detected in vehicles at low speeds, with the windows down, enabling an airborne path between the noise source and the occupants. The squeaks are characterized as bursts of sound concentrated in a band of frequencies extending from approximately 1 to 3 kHz. The bursts of sound, furthermore, occur as discrete events at repetitive subintervals of a rotation cycle of the wheel. Complaints typically characterize the condition as modulated sound or bursts of sound occurring once, twice or other multiples of the rotation cycle of the wheel.

Detailed diagnostics of the underlying excitation source of the disturbance have identified stick-slip conditions at the interface of relative sliding zones at contact sites between the wheel cover and the wheel. The wheel cover is typically attached to the wheel through plastic nuts engaging external threads on wheel lug nuts. Surfaces of the wheel cover also contact the wheel at other sites distant from the vicinity of the wheel lug nuts. These secondary zones of contact are intentional and required to achieve integrity of attachment and styling objectives.

The load of the vehicle is transmitted through the wheel. The wheel rotates through a deformation field (stationary with respect to a ground reference frame) developed due to this load support. As a point on the wheel rotates through this deformation field, relative movement occurs between the wheel and the wheel cover at some of the interfacial contact sites. Through a full rotation, the total amount of relative movement is small (approximately 0.5 millimeters), exhibiting a strictly periodic functional dependency on the rotation cycle of the wheel. Unfortunately, portions of this gross periodic movement are achieved through intermittent, microscopic stick-slip events (8–20 $\mu$m incremental displacements), in turn, producing vibrations in the wheel cover. The wheel cover is suitably coupled to the air in a manner such that the cover vibrations produce fluctuations of sound pressure, subsequently propagating through the air medium, making the events audible to the occupants and nearby observers.

Several attempts have been made to reduce or eliminate noise such as squeaks. One attempt is to use elastomeric rings or adhesive tapes applied at an interface of the wheel cover and the wheel. Another attempt is to use tapes that are individually applied manually (as many as ten to twelve segments) at the interface of the wheel cover and the wheel. However, all of these attempts lack durability because the wheel eventually wears through the rings and tapes.

Therefore, it is desirable to provide a wheel cover with a durable, noise inhibiting feature. It is also desirable to provide a wheel cover for a wheel that eliminates squeaks and other noises. Therefore, there is a need in the art to provide a noise inhibiting wheel cover for a wheel of a vehicle.

SUMMARY OF THE INVENTION

It is, therefore, one object of the present invention to provide a noise inhibiting wheel cover for a wheel of a vehicle.

It is another object of the present invention to provide a noise inhibiting plastic wheel cover for a wheel of a vehicle.

It is yet another object of the present invention to provide a noise inhibiting wheel cover for a wheel of a vehicle that eliminates objectionable noise such as squeaks arising from relative interfacial movement between the wheel cover and the wheel.

To achieve the foregoing objects, the present invention is a noise inhibiting wheel cover for a wheel assembly having a wheel including a substrate adapted to engage the wheel of the wheel assembly. The noise inhibiting wheel cover also includes a layer of noise inhibiting material located at contact sites between the substrate and the wheel of the wheel assembly to reduce noise caused by mechanical actions therebetween.

One advantage of the present invention is that a new noise inhibiting wheel cover is provided for a wheel of a vehicle. Another advantage of the present invention is that the noise inhibiting wheel cover eliminates squeaks or noise arising from actions taking place at the interfaces or interfacial contact sites between the wheel cover and the wheel. Yet another advantage of the present invention is that the noise inhibiting wheel cover incorporates specially selected squeak-inhibiting and durable materials at the interfaces of relative movement between the wheel cover and the wheel to eliminate objectionable sounds such as squeaks. Still another advantage of the present invention is that the noise inhibiting wheel cover reduces or eliminates noise such as squeaks, resulting in warranty reductions due to squeak repairs.

Other objects, features and advantages of the present invention will be readily appreciated, as the same becomes better understood, after reading the subsequent description taken in conjunction with the accompanying drawings.

DESCRIPTION OF THE PREFERRED EMBODIMENT

Figure 1:
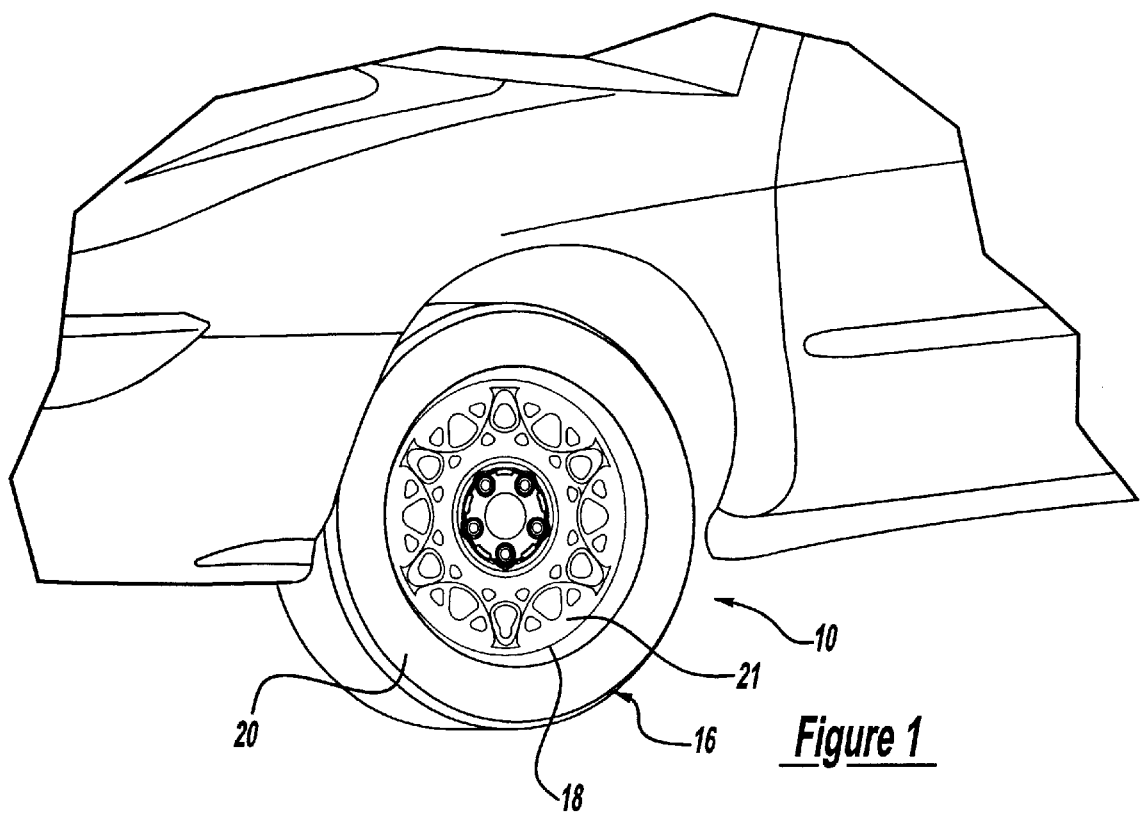
FIG. 1 is a perspective view of a noise inhibiting wheel cover, according to the present invention, illustrated in operational relationship with a wheel of a vehicle.
Figure 2:
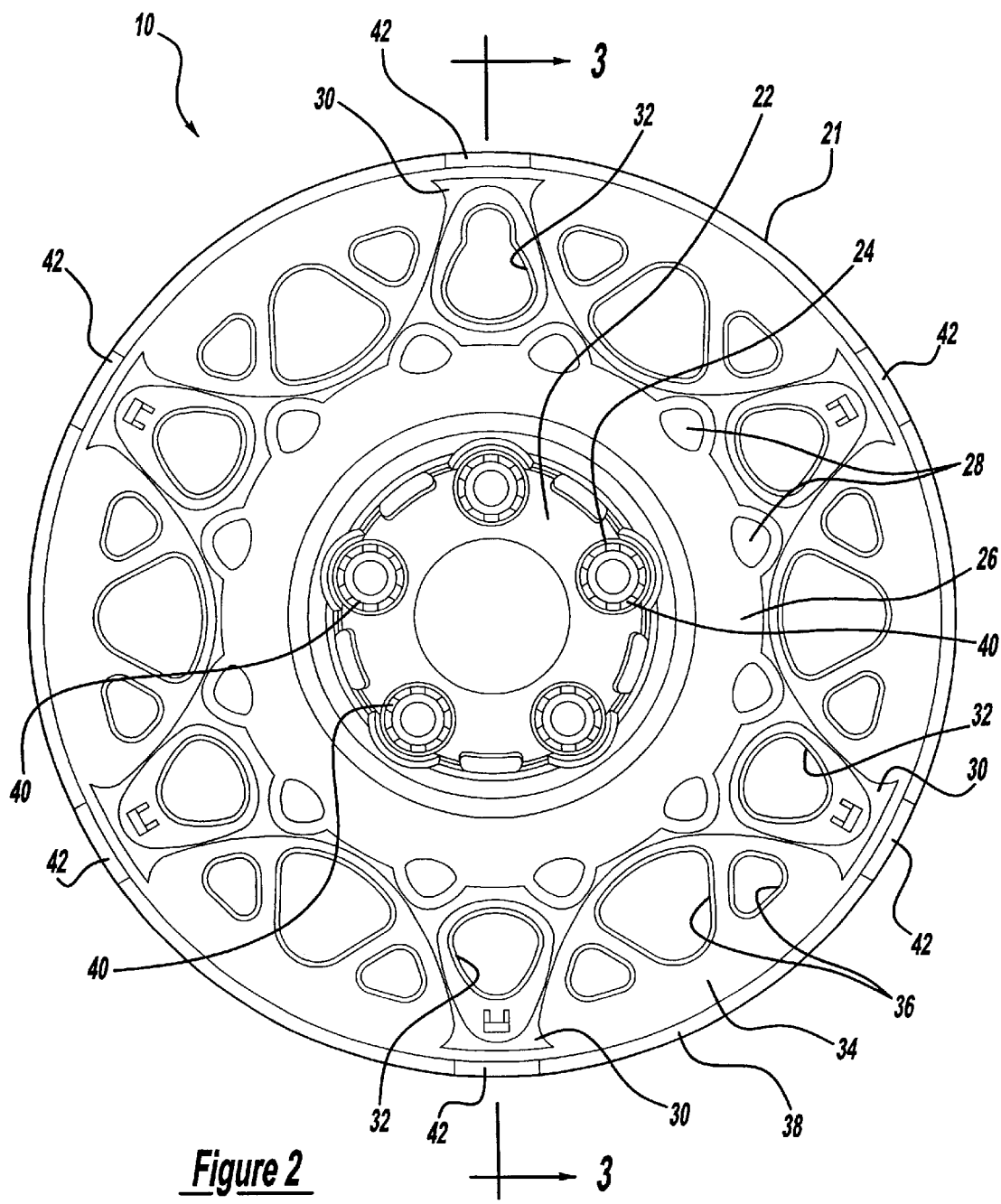
FIG. 2 is an elevational view of the wheel cover of FIG. 1.
Figure 3:
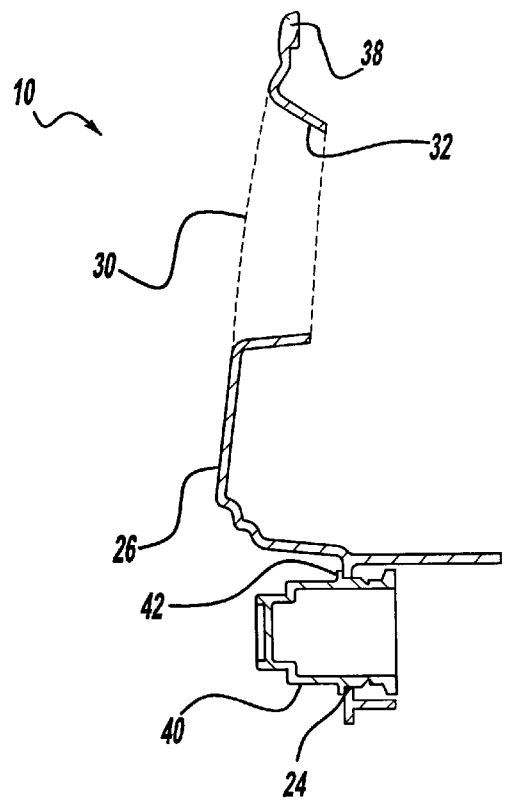
FIG. 3 is a sectional view taken along line 3—3 of FIG. 2.
Figure 3:
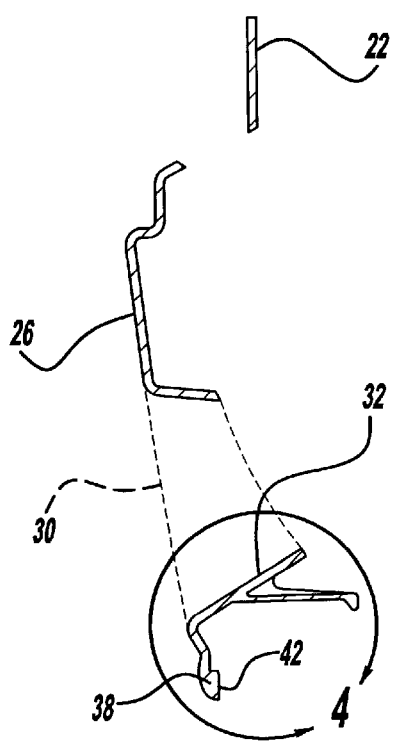

Referring to the drawings and in particular FIGS. 1 and 2, one embodiment of a noise inhibiting wheel cover 10, according to the present invention, is shown for a vehicle such as a motor vehicle, generally indicated at 12. Such motor vehicles 12 typically include a vehicle body 14 (partially shown) mounted upon axles (not shown) having wheel assemblies, generally indicated at 16, for rolling engagement with a surface such as a road. Each of the wheel assemblies 16 includes a wheel 18 operatively connected to the axle and a tire 20 attached to the wheel 18 to engage the road. The noise inhibiting wheel cover 10 is attached to the wheel 18 to cover the wheel 18. It should be appreciated that, except for the noise inhibiting wheel cover 10, the wheel assembly 16 is conventional and known in the art.

Referring to FIGS. 1 through 4, the noise inhibiting wheel cover 10 includes a substrate 21 for covering the wheel 18 of the wheel assembly 16. The substrate 21 includes a central base portion 22. The base portion 22 includes at least one, preferably a plurality of nut pockets 24 disposed circumferentially about the base portion 22. Each nut pocket 24 is generally circular in shape and extends axially through the base portion 22.

The substrate 21 also includes a raised portion 26 extending axially and outwardly therefrom adjacent the base portion 22. The raised portion 26 also extends radially and is generally circular in shape. The raised portion 26 includes at least one, preferably a plurality of recesses or vent holes 28 extending therein.

The substrate 21 includes at least one, preferably a plurality of spoke portions 30 extending radially from the raised portion 26. The spoke portions 30 are spaced circumferentially thereabout. The spoke portion 30 may have a vent or aperture 32 extending axially therethrough.

The substrate 21 also includes a vent portion 34 disposed between the spoke portions 30. The vent portion 34 may have at least one vent or aperture 36 extending axially therethrough.

The substrate 21 includes a flange 38 extending radially from and circumferentially about the spoke portions 30 and vent portions 34. The flange 38 is adapted to contact the wheel 18 of the wheel assembly 16. The flange 38 is generally circular in shape.

The substrate 21 is made of a plastic material such as nylon, ABS (Acrylonitrile-Butadiene-Styrene), polycarbonate or admixtures thereof. The substrate 21 is molded by conventional plastic injection molding and is integral, unitary and formed as one-piece.

The noise inhibiting wheel cover 10 includes at least one, preferably a plurality of nut caps 40, one for each nut pocket 24. The nut cap 40 is generally tubular in shape and has a generally circular cross-sectional shape. The nut cap 40 extends axially and has a shoulder 42 to about the base portion 22. The nut cap 40 is made of a plastic material, preferably a material different from the material of the substrate 21. It should be appreciated that the nut cap 40 extends through the nut pocket 24 and has a cavity therein to accommodate a nut (not shown). It should be appreciated that the substrate 21 of the noise inhibiting wheel cover 10 is secured to the wheel 18 by the nut caps 40 engaging wheel lug nuts (not shown) on the wheel assembly 16 as known in the art. It should also be appreciated that clips (not shown) may be used in place of the nut caps 40 to secure the noise inhibiting wheel cover 10 to the wheel 18.

Figure 4:
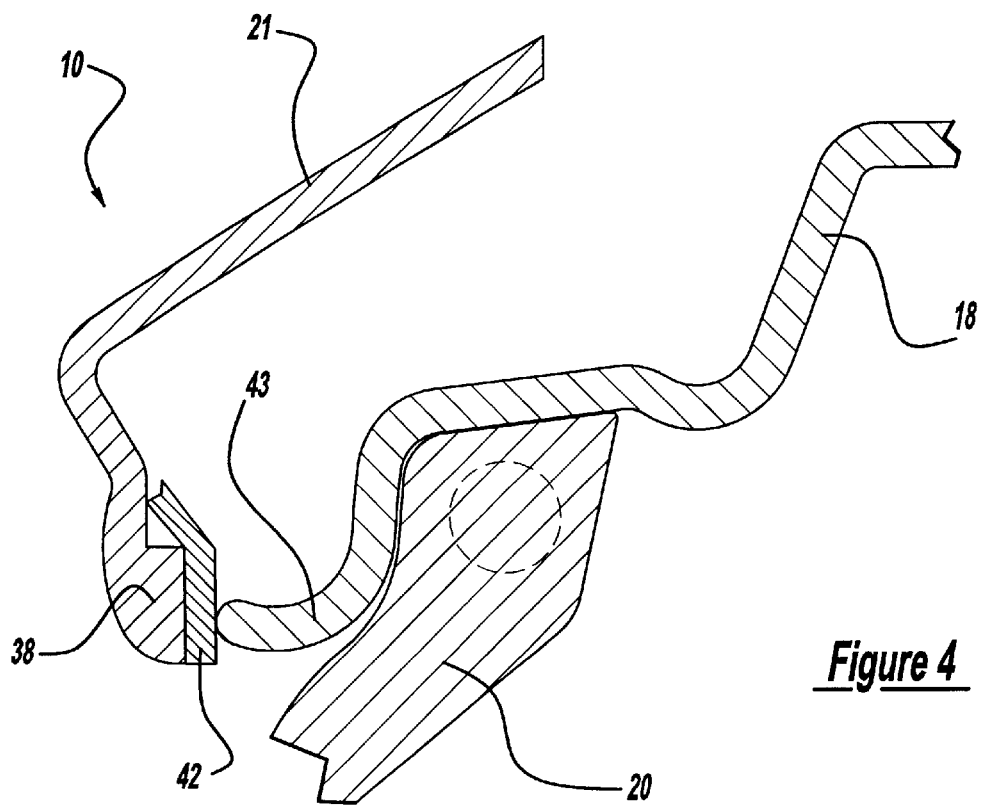
FIG. 4 is an enlarged fragmentary view of a portion of the wheel cover in circle 4 of FIG. 3 illustrated in contact with mating surfaces of the wheel.

The noise inhibiting wheel cover 10 also includes a layer 42 of stick-slip or noise inhibiting material at contact interfaces between the wheel cover 10 and wheel 18. In one embodiment, the contact interface is at the outer periphery or flange 38 of the wheel cover 10, making contact with a wheel flange 43 as illustrated in FIG. 4. Preferably, the layer 42 is a relatively thin ring, either continuous or interrupted based on local contact pressures, of the noise inhibiting material located at the underside of the wheel cover 10 at the flange 38. The noise inhibiting material is a specially selected plastic material such as acetyl plastic commercially available under the trademark DELRIN® from the Dupont Corporation. In the embodiment illustrated, the sites of contact between the substrate 21 of the wheel cover 10 and the wheel 18 is on the flange 38 adjacent each of the spoke portions 30. The layer 42 is applied to the flange 38 by any number of methods, preferably by conventional co-injection molding with that of the substrate material. It should be appreciated that the noise inhibiting wheel cover 10 is made of dual plastic materials, one material for the substrate 21 and another for the interfaces of the wheel cover 10 with the wheel 18.

In operation, the noise inhibiting wheel cover 10 is attached to the wheel 18 of the wheel assembly 16. The layer 42 contacts the wheel 18 and reduces or eliminates noise such as squeaks caused by the actions at the interface of the wheel cover 10 and the wheel 18.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A noise inhibiting wheel cover for a wheel assembly having a wheel comprising:

a substrate engaging the wheel and extending radially outward on the wheel beyond an outer flange of the wheel, the outer flange including a terminus and the substrate including an outer peripheral flange completely encircling the outer flange of the wheel, the outer peripheral flange having a contact interface at an underside of the wheel cover contacting the outer flange of the wheel at the terminus, wherein the contact interface includes a relatively thin layer of noise inhibiting material at the contact interface reducing noise generated by actions at the contact interface between the wheel cover and the wheel.

2. A noise inhibiting wheel cover according to claim 1 wherein the wheel cover includes a plurality of spoke portions radiating outwardly and terminating near the outer terminal flange wherein the noise inhibiting material comprises a plurality of interrupted segments located only adjacent and radially outside the spoke portions.

* * * * *